(12) United States Patent
Pelin et al.

(10) Patent No.: US 8,431,104 B2
(45) Date of Patent: Apr. 30, 2013

(54) PROCESS FOR THE PRODUCTION OF CHLORINE DIOXIDE

(75) Inventors: Kalle Hans Thomas Pelin, Ytterby (SE); Fredrik Persson, Lerum (SE); Erika Stoltz, Lycke (SE)

(73) Assignee: Akzo Nobel N.V., Arnhem (NL)

( * ) Notice: Subject to any disclaimer, the term of this patent is extended or adjusted under 35 U.S.C. 154(b) by 13 days.

(21) Appl. No.: 12/522,735

(22) PCT Filed: Jan. 3, 2008

(86) PCT No.: PCT/SE2008/050005
§ 371 (c)(1),
(2), (4) Date: Oct. 9, 2009

(87) PCT Pub. No.: WO2008/085122
PCT Pub. Date: Jul. 17, 2008

(65) Prior Publication Data
US 2010/0055027 A1    Mar. 4, 2010

Related U.S. Application Data

(60) Provisional application No. 60/884,675, filed on Jan. 12, 2007.

(30) Foreign Application Priority Data

Jan. 12, 2007 (EP) .................................. 07100484

(51) Int. Cl.
*C01B 11/02*    (2006.01)

(52) U.S. Cl.
USPC ...... 423/477; 423/478; 423/240 S; 423/245.1; 95/141; 95/142

(58) Field of Classification Search .................. 423/477, 423/478, 240 S, 245.1; 95/141, 142
See application file for complete search history.

(56) References Cited

U.S. PATENT DOCUMENTS

| 2,833,624 A | 5/1958 | Sprauer |
| 4,129,484 A | 12/1978 | Larsson |
| 4,421,730 A | 12/1983 | Isa et al. |
| 4,534,952 A | 8/1985 | Rapson et al. |

(Continued)

FOREIGN PATENT DOCUMENTS

| EP | 0 612 686 A2 | 8/1994 |
| GB | 460376 | 1/1937 |

(Continued)

OTHER PUBLICATIONS

English language translation of Japanese Laid-Open Patent Gazette No. 88-8203 dated Jan. 14, 1988.

(Continued)

*Primary Examiner* — Ngoc-Yen Nguyen
(74) *Attorney, Agent, or Firm* — Robert C. Morriss

(57) ABSTRACT

The invention concerns a process for the production of chlorine dioxide comprising formation of chlorine dioxide in a reaction medium in at least one reaction vessel and withdrawing chlorine dioxide from said at least one reaction vessel, the process further comprising a step of treating reaction medium or at least one process stream originating directly or indirectly from said at least one reaction vessel with an adsorbent efficient for removing chlorinated organic compounds from said at least one process stream.

18 Claims, 2 Drawing Sheets

U.S. PATENT DOCUMENTS

| | | | |
|---|---|---|---|
| 5,091,166 A | 2/1992 | Engström et al. | |
| 5,091,167 A | 2/1992 | Engström et al. | |
| 5,366,714 A | 11/1994 | Bigauskas | |
| 5,478,446 A | 12/1995 | Falgén et al. | |
| 5,487,881 A | 1/1996 | Falgén et al. | |
| 5,674,466 A | 10/1997 | Dahl et al. | |
| 5,770,171 A | 6/1998 | Sundblad et al. | |
| 5,792,316 A * | 8/1998 | Tsai | 162/65 |
| 5,858,322 A | 1/1999 | Gray | |
| 5,895,638 A | 4/1999 | Tenney | |
| 6,322,690 B1 | 11/2001 | Hammer-Olsen et al. | |
| 6,387,344 B1 | 5/2002 | Tenney et al. | |
| 6,585,950 B1 | 7/2003 | Dahl et al. | |
| 6,790,427 B2 | 9/2004 | Charles et al. | |
| 7,022,162 B2 | 4/2006 | Kreisz et al. | |
| 2003/0031621 A1 | 2/2003 | Gravitt et al. | |
| 2004/0144252 A1 * | 7/2004 | Kreisz et al. | 95/142 |
| 2004/0175322 A1 | 9/2004 | Woodruff et al. | |
| 2005/0186131 A1 | 8/2005 | Charles et al. | |
| 2006/0133983 A1 | 6/2006 | Charles et al. | |
| 2007/0116637 A1 * | 5/2007 | Woodruff et al. | 423/478 |

FOREIGN PATENT DOCUMENTS

| | | |
|---|---|---|
| JP | 63-008203 A | 1/1988 |
| JP | 3-115102 A | 5/1991 |
| WO | WO 98/16462 A1 | 4/1998 |
| WO | WO 02/064235 A2 | 8/2002 |
| WO | WO 2006/033609 A1 | 3/2006 |
| WO | WO 2006/062455 A1 | 6/2006 |

OTHER PUBLICATIONS

Abstract of JP 3-115102 A from Questel QPAT, May 1991.
Dence et al., "Pulp Bleaching-Principles and Practice," 1996, pp. 61-69, Section II: Raw Materials, Chapter 2: Bleaching Chemicals: Chlorine Dioxide, Tappi Press, Atlanta, GA.

* cited by examiner

PROCESS FOR THE PRODUCTION OF CHLORINE DIOXIDE

This application is a national stage filing under 35 U.S.C. §371 of PCT/SE2008/050005, filed Jan. 3, 2008, which claims priority to European Patent Application No. 07100484.0, filed Jan. 12, 2007, and U.S. Provisional Application No. 60/884,675, filed Jan. 12, 2007, the contents of which are incorporated herein by reference in their entirety.

The present invention relates to a process for the production of chlorine dioxide comprising formation of chlorine dioxide in a reaction medium in a reaction vessel and withdrawing chlorine dioxide from said reaction vessel, and further comprising treating at least one process stream originating from the reaction vessel with an adsorbent.

Chlorine dioxide used in aqueous solution is of considerable commercial interest, mainly in pulp bleaching, but also in water purification, fat bleaching, removal of phenols from industrial wastes etc. It is therefore desirable to provide processes in which chlorine dioxide can be efficiently produced.

There are numerous different processes for chlorine dioxide production. Most large scale processes in commercial use are run at pulp mills and involve continuous reaction of alkali metal chlorate in an acidic reaction medium with a reducing agent such as hydrogen peroxide, methanol, chloride ions or sulfur dioxide to form chlorine dioxide that is withdrawn as a gas from the reaction medium. An overview of such process can be found in "Pulp Bleaching—Principles and Practice", TAPPI PRESS 1996, Section II: Raw Materials, Chapter 2: Bleaching Chemicals: Chlorine Dioxide, p. 61-69.

In one kind of processes the reaction medium is maintained in a single reaction vessel under boiling conditions at subatmospheric pressure, wherein alkali metal salt of the acid is precipitated and withdrawn as a salt cake. Examples of such processes are described in U.S. Pat. Nos. 5,091,166, 5,091,167, 5,366,714 and 5,770,171, and in WO 2006/062455. The salt cake may also be washed with water or another solvent, as described in e.g. U.S. Pat. Nos. 5,674,466 and 6,585,950.

In another kind of processes the reaction medium is maintained under non-crystallising conditions, generally at substantially atmospheric pressure. In most cases depleted reaction medium from a first reaction vessel is brought to a second reaction vessel for further reactions to produce chlorine dioxide. Depleted reaction medium withdrawn from the final reaction vessel, usually referred to as residual acid, contains acid, alkali metal salt of the acid and normally some unreacted alkali metal chlorate. The residual acid may sometimes, at least partly, be used in the pulping process. Examples of non-crystallising chlorine dioxide generation processes are described in EP 612686, WO 2006/033609, JP 03-115102 and JP 88-008203.

It has also been disclosed to treat depleted reaction medium or dissolved salt cake electrochemically, as described in e.g. U.S. Pat. Nos. 4,129,484, 5,478,446, 5,487,881, 5,858,322 and 6,322,690.

In processes for small scale generation of chlorine dioxide, such as for water purification applications or small bleaching plants, the chlorine dioxide is usually not separated from the reaction medium. Instead, a product stream comprising chlorine dioxide, salt, excess acid and optionally un-reacted chlorate is withdrawn from the reactor and used directly, usually after dilution in an eductor. Examples of such processes are described in U.S. Pat. Nos. 2,833,624, 4,534,952, 5,895,638, 6,387,344, 6,790,427 and in US patent applications Publ. No. 2004/0175322, Publ. No. 2003/0031621, Publ. No. 2005/0186131 and Publ. No. 2006/0133983.

The modern commercial processes for chlorine dioxide production at pulp mills are highly efficient and only very small amounts of unwanted by-products, such as chlorine, are generated. However, it has now been found that process streams originating from the reaction vessel may contain small amounts of chlorinated organic compounds, such as chlorinated dibenzo-p-dioxins or dibenzo-furans. Although the amounts thereof are extremely low, the high toxicity of some chlorinated compounds renders it desirable to reduce the content thereof to as high extent as possible, particularly as some process streams finally end up in the pulp making process.

The origin of the chlorinated organic compounds is not fully clear. Attempts to use raw materials of high purity in respect of organic contaminants have been successful, but not always managed to fully eliminate the chlorinated organic compounds from the process streams. Thus, there is a need for further improvements.

The present invention concerns a process for the production of chlorine dioxide comprising formation of chlorine dioxide in a reaction medium in at least one reaction vessel and withdrawing chlorine dioxide from said at least one reaction vessel, the process further comprising a step of treating reaction medium or at least one process stream originating directly or indirectly from said at least one reaction vessel with an adsorbent efficient for removing chlorinated organic compounds from said at least one process stream.

According to the invention, reaction medium or process streams in all kinds of chlorine dioxide generating processes may be treated, particularly those in which the chlorine dioxide is formed by reacting chlorate ions and a reducing agent in an acidic aqueous reaction medium, but also processes based on other raw materials such as alkali metal chlorite. The processes include those described in the earlier mentioned publications and those used commercially such as SVP-LITE®, SVP-HP®, SVP®-SCW, SVP®-HCL, HP-A®, Mathieson, R2, R3, R8, R10 and integrated chlorine dioxide/chlorate processes. Thus, the invention is applicable on single vessel processes operated at subatmospheric pressure and crystallising conditions, as well as processes operated at substantially atmospheric pressure and non-crystallising conditions. Further, the chlorine dioxide generation processes may be operated with various reducing agents such as methanol, hydrogen peroxide, sulfur dioxide, chloride ions and mixtures thereof, as well as with various mineral acids such as sulfuric acid, hydrochloric acid, chloric acid and mixtures thereof. The chlorate may be supplied as alkali metal chlorate like sodium chlorate, as chloric acid, or any mixture thereof. In most cases, chlorine dioxide is withdrawn from the reaction medium as a gas that subsequently may be absorbed into water, but the invention is applicable also for other kinds of processes.

Process streams that may be treated include streams originating directly or indirectly from the reaction vessel. Process streams originating indirectly from the reaction vessel refer to streams that have undergone one or more unit operations such as absorption, stripping, electrochemical treatment etc. Specific examples of process streams that may be treated according to the invention include gas containing chlorine dioxide withdrawn from the reaction vessel, aqueous solutions containing chlorine dioxide, e.g. obtained by absorbing gas withdrawn from the reaction vessel into water, reaction medium from the reaction vessel, e.g. reaction medium recirculating through a heater, filter or any other device, and residual acid withdrawn from the reaction vessel or obtained by dissolving solid salt obtained in the reaction vessel or in a separate crystalliser. In a process operating under non-crystallising conditions it has been found advantageous to treat residual acid originating from the final reaction vessel. In a process operating under crystallising conditions it has been found advantageous to treat gas containing chlorine dioxide withdrawn from the reaction vessel or an aqueous solution obtained by absorbing such gas into water.

Treatment of process streams may be done by continuously or batch-wise contacting the liquid or gas with a solid adsorbent in any kind of vessel, column or tower suitable for liquid-solid or gas-solid contact. Examples of practical solutions include fixed bed adsorbers, packed bed columns, moving bed adsorbers, fluidised bed adsorbers, slurry or entrained dust cloud contacting followed by filtration, electrostatic precipitation or cyclone separation. It is also possible to treat a liquid process stream, such as residual acid, with a dispersant, for example a surfactant or a defoamer, prior to the adsorption step.

Reaction medium may be treated by being contacted with a solid adsorbent inside the reaction vessel, for example by keeping the adsorbent in a cartridge or other kind of holder inside the reactor.

Usually the original temperature of the reaction medium or process stream can be maintained, for example from about 30 to about 100° C. or from about 40 to about 85° C., although it is fully possible also to heat or cool the process stream before contacting the adsorbent. The average contact time may, for example, be from about 10 min to about 10 hrs or from about 15 min to about 3 hrs.

The adsorbent may be in any physical shape, like granules or any kind of monolithic bodies such as, honeycomb structures.

Figure 1:
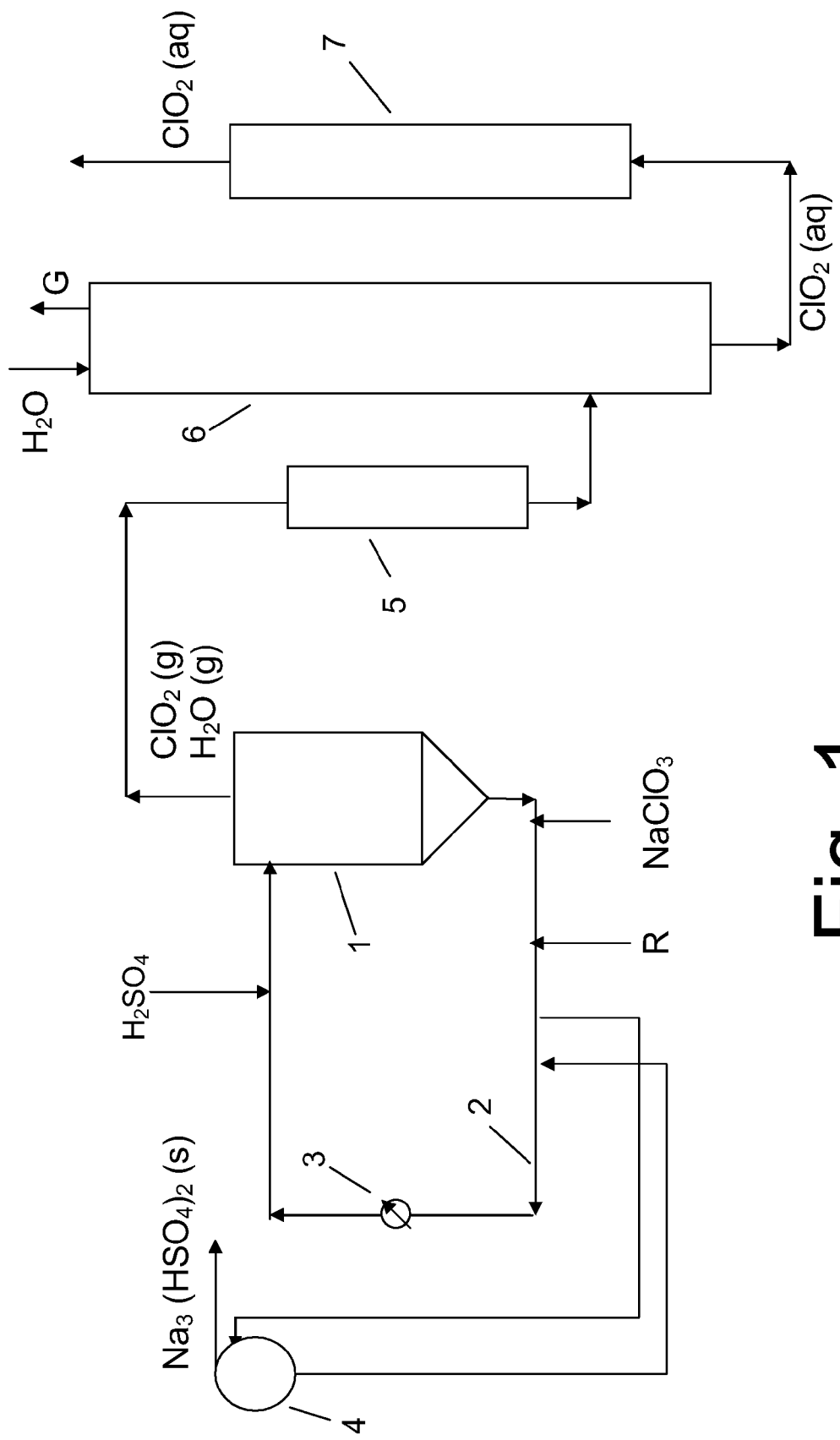
FIG. 1 is a schematic of a process for the production of chlorine dioxide under crystallizing conditions.

At least part of the chlorinated organic compounds in the reaction medium or process stream are adsorbed on the adsorbent. After a certain time of operation, ideally during periodic maintenance stops or for example from about 8 hours to about 24 months, the used adsorbent is preferably regenerated or replaced and taken for regeneration or destruction.

Examples of suitable adsorbents include those based on carbon like activated carbon, soot, coke, charcoal, lignite or carbon fullerene tubes, or other materials like zeolites, silica, hydrophobic organic polymers such as polyesters or polyolefines like polyethylene or polypropylene, metal oxides or metals such as $TiO_2$, $V_2O_5$, $WO_3$, Pd, Cr or mixtures thereof, optionally supported on a carrier like silica. Metal oxides may also catalyse decomposition of adsorbed compounds at elevated temperature, rendering it favourable to treat the reaction medium or a process stream at a temperature of at least about 100° C.

Examples of particularly useful adsorbents include those made of at least one organic polymer like polyolefines such as polyethylene or polypropylene containing filler particles efficient for adsorbing chlorinated organic compounds. The filler particles may be made of carbon, for example activated carbon, soot or coke. The content of filler particles may, for example, be from about 0.1 to about 30 wt %. When fully used, the adsorbent may be destroyed by incineration. Such adsorbents are described in U.S. Pat. No. 7,022,162 and are also commercially available as granules, for example under the trademark Adiox®.

In many cases it may be advantageous to pass the process stream through a mechanical filter, preferably before contacting the adsorbent to refrain non-soluble contaminants from reaching the adsorbent. Various kinds of filters may be used, such as bag, belt, candle/cartridge, disk, drum, leaf/plate, nutsche, press plate or tube filters.

In many cases, particularly in processes run under non-crystallising conditions, and particularly when hydrogen peroxide is used as reducing agent, it has been found possible to significantly reduce the amounts of chlorinated organic compounds by passing residual acid or any stream of reaction medium through a mechanical filter to remove non-soluble organic materials. Any kind of filter, like those mentioned above, may be used. In these cases it may be possible to obtain significant reduction without using any adsorbent.

Examples of chlorinated organic compounds that may be present in the reaction medium or process streams and removed by adsorption include chlorinated dibenzo-p-dioxins and dibenzo-furans. Specific examples of such compounds include dibenzo-p-dioxins chlorinated in the positions 2,3,7,8; 1,2,3,7,8; 1,2,3,4,7,8; 1,2,3,6,7,8; 1,2,3,7,8,9 and 1,2,3,4,6,7,8; and dibenzo-furans chlorinated in the positions 2,3,7,8; 1,2,3,7,8; 2,3,4,7,8; 1,2,3,4,7,8; 1,2,3,6,7,8; 2,3,4,6,7,8; 1,2,3,7,8,9 and 1,2,3,4,6,7,8; and 1,2,3,4,7,8,9.

In the case there are other halogenated organic compounds in the reaction medium or process stream, such as corresponding brominated compounds, the content thereof will also be reduced by the treatment.

Figure 2:
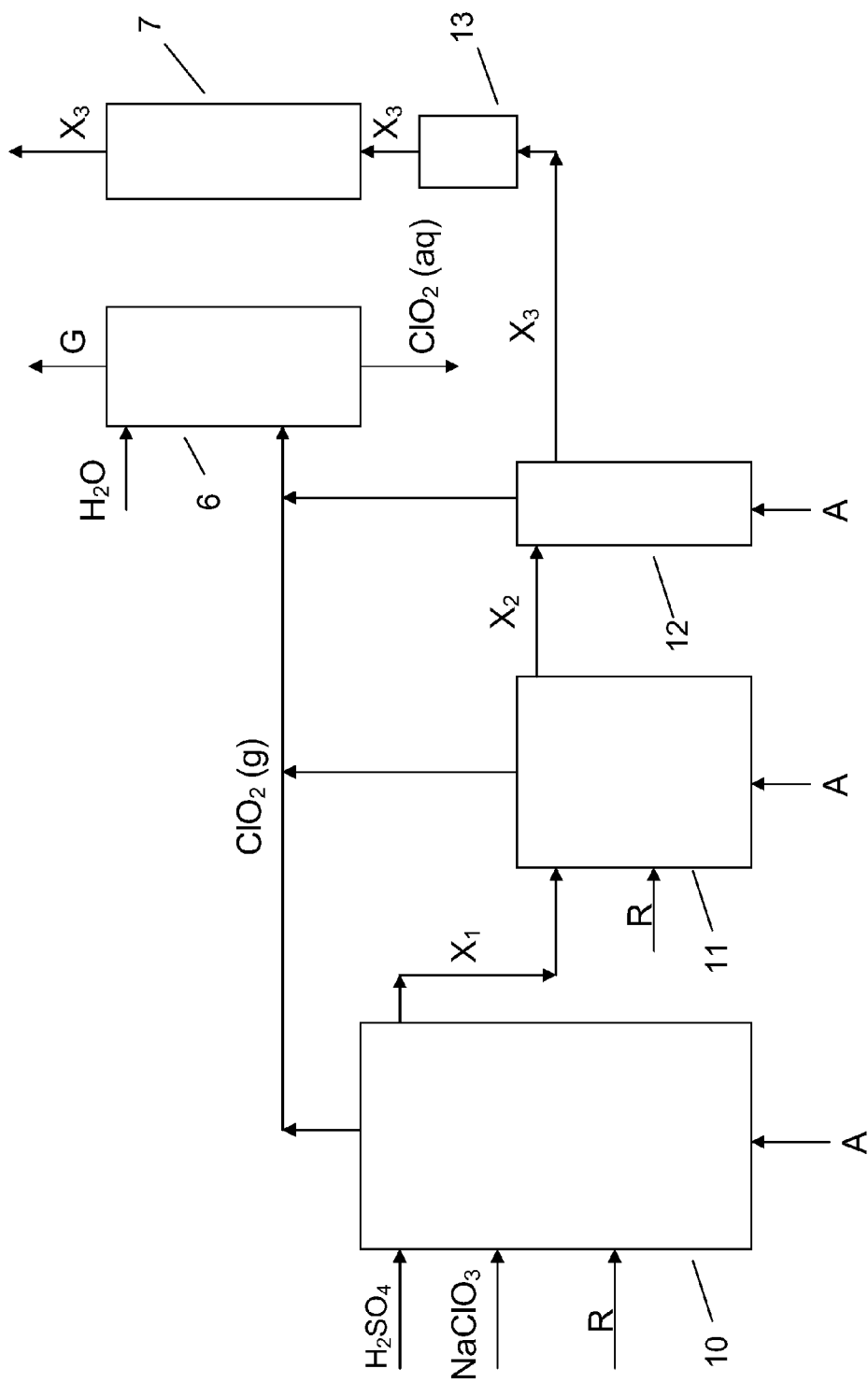
FIG. 2 is a schematic of a process for the production of chlorine dioxide under non-crystallizing conditions.

The invention is further described in the appended drawings, of which FIG. 1 and FIG. 2 schematically show different embodiment, which, however, not should be interpreted as limiting the scope of the invention.

Referring to FIG. 1, a process for the production of chlorine dioxide under crystallising conditions is schematically shown. A reaction vessel 1 holds a reaction medium under subatmospheric pressure, usually from about 8 to about 80 kPa absolute. The reaction medium is circulated through a circulation conduit 2 and a heater 3 (commonly called "reboiler") and back to the reaction vessel 1 at a rate sufficient for keeping the temperature of the reaction medium at the boiling point, usually from about 15 to about 100° C. Feed streams of sodium chlorate, sulfuric acid and reducing agent R like methanol or hydrogen peroxide are fed to various points of the circulation conduits, but may, if appropriate, also be fed directly to the reaction vessel. It is also possible to pre-mix one or more of the feed streams. The concentration of chlorate maintained in the reaction medium may vary within wide limits, for example from about 0.25 moles/litre up to saturation. The acidity of the reaction medium is preferably maintained from about 0.5 to about 12 N. In the reaction medium sodium chlorate, reducing agent and sulfuric acid react to form chlorine dioxide, sodium sulfate and optionally other by-products, depending on the reducing agent used. Chlorine dioxide and other gaseous products are withdrawn as a gas together with evaporated water. Sodium sulfate precipitates as a substantially neutral or acidic salt, depending on the acidity of the reaction medium, and is withdrawn as a salt cake, $Na_2SO_4$ (s) or $Na_3H(SO_4)_2$ (s), by circulating reaction medium through a filter 4. The gas withdrawn from the reaction vessel 1 is brought to a cooler 5 and then an absorber 6 supplied with chilled water dissolving the chlorine dioxide to form chlorine dioxide water $ClO_2$ (aq) while non-dissolved gaseous components are withdrawn as gas G. The chlorine dioxide water is then brought to a column 7 packed with an adsorbent efficient for adsorbing chlorinated organic compounds like dibenzo-p-dioxins and dibenzo-furans, the content of which in the chlorine dioxide water thereby is significantly reduced.

Referring to FIG. 2 a process for the production of chlorine dioxide under non-crystallising conditions is schematically shown. A primary reaction vessel 10 holds a reaction medium at substantially atmospheric pressure, e.g. from about 50 to about 120 kPa absolute, and a preferred temperature from about 30 to about 100° C. Feed streams of sodium chlorate, sulfuric acid and a reducing agent R like hydrogen peroxide enter the primary reaction vessel 10, separately or as mixtures of two or more thereof, while an inert gas A like air is blown into the bottom. In the reaction medium sodium chlorate, reducing agent and sulfuric acid react to form chlorine dioxide, sodium sulfate and optionally other by-products, depending on the reducing agent used. Chlorine dioxide and other gaseous products are withdrawn as a gas together with the inert gas. Depleted reaction medium $X_1$ is brought to a secondary reaction vessel 11 also supplied with a feed stream of reducing agent R and inert gas like air. Also here chlorine dioxide is produced in the reaction medium and is withdrawn with other gaseous products as a gas together with the inert gas, while depleted reaction medium $X_2$ is brought to a stripper 12 supplied with inert gas like air to remove substantially all gas from the liquid. The absolute pressure maintained in the reaction vessels 10, 11 is preferably from about 50 to about 120 kPa. The acidity of the reaction medium in the reaction vessels 10, 11 is preferably maintained from about 4 to about 14 N. The concentration of alkali metal chlorate in the reaction medium in the first reaction vessel 10 is preferably maintained from about 0.05 mole/litre to saturation, and in the second reaction vessel 11 preferably from about 9 to about 75 mmoles/litre. The gas from the primary and secondary reaction vessels 10, 11 and the stripper 12 is brought to an absorber 6 operated as in the process of FIG. 1. The liquid phase $X_3$ from the stripper 12, referred to as residual acid, is brought to a filter 13 removing non-dissolved material such as an organic phase that may have been formed from organic impurities in raw materials like water or hydrogen peroxide. At this stage also a significant part of the chlorinated organic compounds may be removed. After passing the filter 13, the residual acid $X_3$ is brought to a column 7 packed with an adsorbent efficient for adsorbing chlorinated organic compounds like dibenzo-p-dioxins and dibenzo-furans, the content of which in the residual acid thereby is significantly reduced.

Example 1

Residual acid from a process run as described in FIG. 2 with hydrogen peroxide as reducing agent was treated with an adsorbent of the trademark Adiox®, granules of polypropylene containing carbon particles. Samples were collected in two glass bottles, each of 1 liter residual acid. To each bottle 25 grams of Adiox® granules were added. The bottles were fixed to a shaking plate in a water bath holding 58° C. and were shaken for two hours. Then the granules were separated from the residual acid. The samples were analysed in respect of dibenzo-p-dioxins and dibenzo-furans before and after the treatment with the adsorbent. The results, expressed as toxic equivalents of 2,3,7,8-tetrachlorodibenzo-p-dioxin, appear in the table below:

|  | WHO-PCDD/F-TEQ | |
| --- | --- | --- |
|  | ($pg/dm^3$) | (pg/kg) |
| Untreated residual acid | 400 | 290 |
| Adiox ® treated residual acid | 260 | 190 |

The results for the various congeners are shown in the following table:

| Congener | Untreated spend acid ($pg/dm^3$) | Adiox ® treated residual acid ($pg/dm^3$) |
| --- | --- | --- |
| 2378TCDD | ND(1.4) | ND(1.0) |
| 12378PeCDD | ND(6.3) | ND(2.5) |
| 123478HxCDD | ND(4.8) | ND(4.0) |
| 123678HxCDD | ND(4.8) | ND(4.0) |
| 123789HxCDD | ND(4.8) | ND(4.0) |
| 1234678HpCDD | ND(11) | ND(4.1) |
| OCDD | ND(24) | ND(11) |
| 2378TCDF | 870 | 480 |
| 12378PeCDF | 750 | 520 |
| 23478PeCDF | 350 | 240 |
| 123478HxCDF | 840 | 540 |
| 123678HxCDF | 81 | 59 |
| 234678HxDCF | 27 | 12 |
| 123789HxCDF | 48 | 41 |
| 1234678HpCDF | 94 | 64 |
| 1234789HpCDF | 210 | 150 |
| OCDF | 130 | 54 |

Example 2

Residual acid from a process run as described in FIG. 2 with hydrogen peroxide as reducing agent was passed through an adsorption column filled with 13.0 kg of the same kind of Adiox® granules as in Example 1. The height of the adsorption bed was 1.5 m and the diameter 1.24 dm. The residual acid flow was 40 kg/h and the test duration was 21 days. An analysis of the Adiox® granules after the test showed that in average 17 pg TEQ/kg residual acid had been adsorbed in the granules and in addition 5 pg TEQ/kg residual acid were adhering to the granule surfaces. This added up to a total separation of about 440 ng TEQ from the treated about 20 tonnes of residual acid.

The invention claimed is:

1. A process for the production of chlorine dioxide comprising formation of chlorine dioxide in a reaction medium in at least one reaction vessel, said reaction medium containing chlorinated organic compounds, and withdrawing chlorine dioxide from said at least one reaction vessel, the process further comprising a step of treating said reaction medium or at least one process stream originating directly or indirectly from said at least one reaction vessel with an adsorbent efficient for removing said chlorinated organic compounds from said reaction or at least one process stream;
    wherein the process stream originating indirectly from said at least one reaction vessel is a stream in the chlorine dioxide production process that has undergone one or more unit operations selected from the group consisting of absorption, stripping and electrochemical treatment.

2. The process of claim 1, further comprising passing the at least one process stream through a mechanical filter before contacting the adsorbent.

3. The process of claim 1, wherein the chlorinated organic compounds comprise at least one chlorinated dibenzo-p-dioxin or dibenzo-furan.

4. The process of claim 1, wherein the at least one process stream treated includes gas containing chlorine dioxide withdrawn from the at least one reaction vessel.

5. The process of claim 1, wherein the at least one process stream treated includes an aqueous solution containing chlorine dioxide.

6. The process of claim 5, wherein the aqueous solution containing chlorine dioxide is obtained by absorbing gas containing chlorine dioxide withdrawn from the reaction vessel into water.

7. The process of claim 1, wherein the at least one process stream treated includes residual acid containing acid and alkali metal salt of the acid withdrawn from the reaction vessel.

8. The process of claim 1, wherein the at least one process stream treated includes reaction medium from the reaction vessel.

9. The process of claim 1, wherein the at least one process stream treated includes an aqueous solution of a solid salt obtained by dissolving solid salt obtained in the reaction vessel or a separate crystalliser.

10. The process of claim 8, wherein reaction medium is treated by being contacted with a solid adsorbent inside the reaction vessel.

11. The process of claim 1, wherein the chlorine dioxide is formed by reacting chlorate ions and a reducing agent in an acidic aqueous reaction medium.

12. The process of claim 11, wherein the process is operated with hydrogen peroxide as reducing agent.

13. The process of claim 11, wherein the process is operated with chloride ions as reducing agent.

14. The process of claim 11, wherein the process is operated with methanol as reducing agent.

15. The process of claim 1, wherein the adsorbent is in the form of granules.

16. The process of claim 1, wherein the adsorbent is made of at least one organic polymer containing filler particles efficient for adsorbing chlorinated organic compounds.

17. A process for the production of chlorine dioxide comprising formation of chlorine dioxide in a reaction medium in at least one reaction vessel, said reaction medium containing chlorinated organic compounds, and withdrawing chlorine dioxide from said at least one reaction vessel, the process further comprising a step of treating said reaction medium or at least one process stream originally directly or indirectly from said at least one reaction with an adsorbent efficient for removing said chlorinated organic compounds from said reaction medium or at least one process stream, wherein the chlorinated organic compounds comprise at least one congener being a chlorinated dibenzo-p-dioxin or dibenzo-furan at low concentration;

wherein the process stream originating indirectly from said at least one reaction vessel is a stream in the chlorine dioxide production process that has undergone one or more unit operations selected from the group consisting of absorption, stripping and electrochemical treatment.

18. A process for the production of chlorine dioxide comprising formation of chlorine dioxide in a reaction medium in at least one reaction vessel, said reaction medium containing chlorinated organic compounds, and withdrawing chlorine dioxide from said at least one reaction vessel, the process further comprising a step of treating said reaction medium or at least one process stream originating directly or indirectly from said at least one reaction vessel with an adsorbent efficient for removing said chlorinated organic compounds from said reaction medium or at least one process stream, wherein the at least one process stream treated includes an aqueous solution containing chlorine dioxide and the adsorbent is made of at least one organic polymer containing filler particles efficient for adsorbing said chlorinated organic compounds;

wherein the process stream originating indirectly from said at least one reaction vessel is a stream in the chlorine dioxide production process that has undergone one or more unit operations selected from the group consisting of absorption, stripping and electrochemical treatment.

* * * * *